(No Model.)

G. D. SMITH.
VEHICLE WHEEL.

No. 307,346. Patented Oct. 28, 1884.

WITNESSES:
W. W. Hollingsworth
Jno. C. Kenson

INVENTOR:
Geo. D. Smith
BY Munn & Co.
ATTORNEYS.

N. PETERS. Photo-Lithographer. Washington. D. C.

UNITED STATES PATENT OFFICE.

GEORGE D. SMITH, OF GLENN SPRINGS, SOUTH CAROLINA.

VEHICLE-WHEEL.

SPECIFICATION forming part of Letters Patent No. 307,346, dated October 28, 1884.

Application filed July 14, 1884. (No model.)

*To all whom it may concern:*

Be it known that I, GEORGE D. SMITH, a citizen of the United States, residing at Glenn Springs, in the county of Spartanburg and State of South Carolina, have invented certain new and useful Improvements in Vehicle-Wheels, of which the following is a description.

This invention relates to wheels for carriages, wagons, &c.; and it has for its object to provide means whereby dust and dirt may be entirely excluded from the wheel-bearing, and means whereby the wheel may be readily taken apart for repairs.

To this end my invention consists in the construction and combination of parts hereinafter described and claimed, reference being had to the accompanying drawings, in which—

Figure 1:
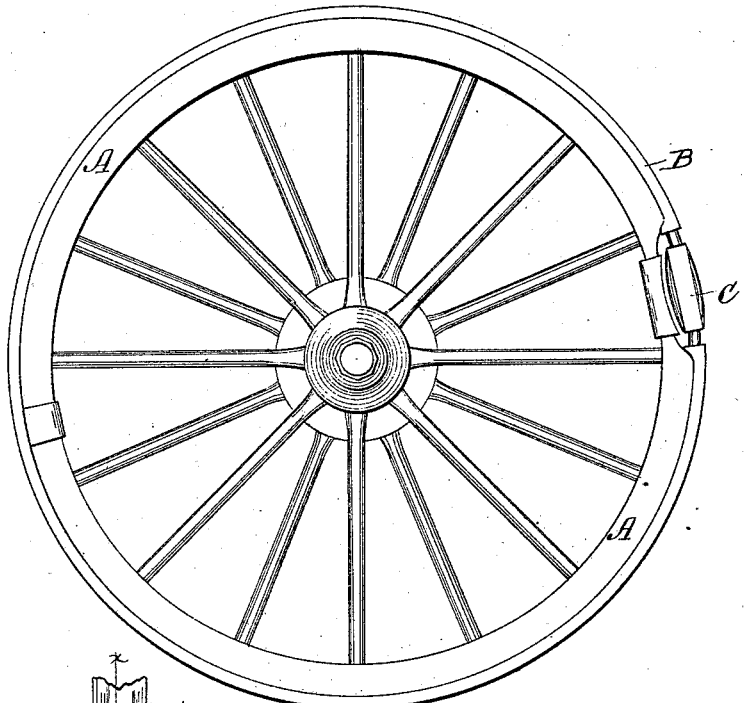
Figure 2:
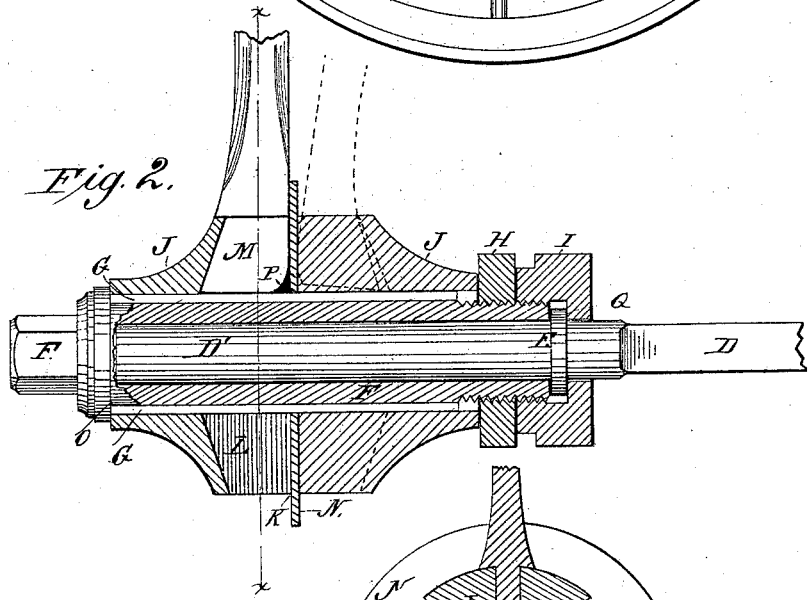
Figure 3:
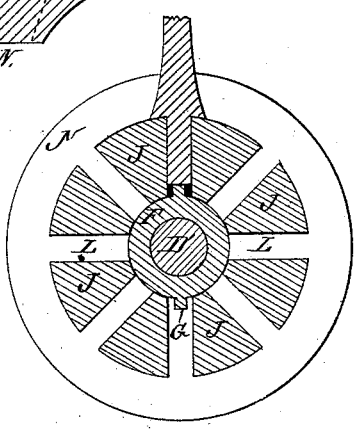

Figure 1 is a front elevation of my wheel. Fig. 2 is a central longitudinal section through the hub thereof, showing a portion of one spoke, a portion of the axle, and the outer or front end of the box in elevation. Fig. 3 is a transverse vertical section at *x x*, Fig. 2.

A represents the rim of the wheel, which may be made in any manner adapted to be loosened and again tightened at will. The rim here shown and the tire B thereon are capable of being loosened or tightened by means of the screws and nut C in the tire; but as this is the subject of a former patent of mine, I do not here describe it.

D represents my wheel-axle, provided with a fixed collar, E, and made round, as usual, along the arm D', but having no screw on its front end for a nut.

F is the box, capped and shaped to any fancy form at its front end, made cylindrical, and provided with one or more splines, G, along its body, and with a screw-thread at its rear end to receive two nuts, H and I.

J represents the body of the hub, made in two pieces, divided by a central vertical plane at K. The hub fits closely upon the box F, having grooves to receive the splines G, so that the box may be drawn out of both parts of the hub at the front end. The mortises L in the hub for the spoke-tenons are made longitudinally dovetailing, and the spoke-tenons M are correspondingly dovetailed, so as to be held firmly thereon when the two parts of the hub are forced together upon the disk N. This disk fits around the box and extends outward between the inner faces of the spokes, serving to steady them. The two parts of the hub are forced endwise together by means of the nut H at one end of the box, opposed by a shoulder or head, O, at the other end. The inner angle, T, of the tenon is cut away a little, to permit the tenon to be worked into the mortise by tipping it, as shown in dotted lines, when the hub is a little loosened. By this means the spokes may be placed in when fitting the mortises so closely as to require a little driving, and afterward be firmly held by tightening the nut H; or the nut H and one-half the hub may be removed when it is desirable to first fit the outer ends of the spokes in the rim, and then place the tenons into the hub. The nut I engages the screw-thread on the end of the box F, and is provided with an internally-projecting flange, Q, which engages the collar E on the axle, and holds the wheel on its bearing thereby. The collar E is closely covered into the nut I, thus preventing the working of sand or dirt into the bearing. When the nut I is unscrewed, the wheel may be removed from the axle; but the nut, being behind the collar, must stay on the axle, and cannot be lost.

What I claim as my invention, and desire to secure by Letters Patent, is—

1. The combination, with the box F, closed at its front end, provided with a screw-thread at its rear end, and with splines along its body, of a hub, J, consisting of two pieces parted on a central vertical transverse plane at K, having grooves to engage the box-splines, and mortised in their adjacent ends to receive spokes, a disk, N, fitting around the box and extending out beyond the periphery of the hub, and a screw-nut, H, to engage the threaded end of the box and force the parts of the hub together, as shown and described.

2. The combination, with a wheel-box, F, having a shoulder, O, on its front end and a screw-thread on its rear end, of a hub, J, made in two parts divided by a central transverse plane, and having dovetail-shaped mortises, a disk, N, fitted on the box and extending between and beyond the two parts of the hub, spokes, each having a tenon, M, dovetailed on one edge and rounded at the opposite angle, and a screw-nut, H, adapted to engage the threaded end of the box, as shown and described.

GEORGE D. SMITH.

Witnesses:
W. X. STEVENS,
SOLON C. KEMON.